United States Patent
Moore

(10) Patent No.: US 7,001,524 B2
(45) Date of Patent: Feb. 21, 2006

(54) METHOD FOR REMOVING SCALE CAUSING CHEMICALS IN HOT WATER SYSTEMS

(75) Inventor: Steven Clay Moore, 8211 Long Canyon Dr., Austin, TX (US) 78732

(73) Assignee: Steven Clay Moore, Austin, TX (US)

( * ) Notice: Subject to any disclaimer, the term of this patent is extended or adjusted under 35 U.S.C. 154(b) by 31 days.

(21) Appl. No.: 10/449,509

(22) Filed: Jun. 2, 2003

(65) Prior Publication Data

US 2004/0238452 A1    Dec. 2, 2004

(51) Int. Cl.
C02F 1/02    (2006.01)

(52) U.S. Cl. .................. 210/709; 122/13.01; 122/14.1; 122/19.1; 210/712; 210/714; 210/737

(58) Field of Classification Search ............ 122/13.01, 122/14.1, 19.1; 210/696, 714, 715, 709, 210/712, 739, 746, 805, 807, 94, 95, 96.1, 210/184, 737
See application file for complete search history.

(56) References Cited

U.S. PATENT DOCUMENTS

| | | | | |
|---|---|---|---|---|
| 314,150 | A * | 3/1885 | Roeske .................. 210/185 |
| 3,692,179 | A * | 9/1972 | Moore .................. 210/94 |
| 4,347,133 | A * | 8/1982 | Brigante .................. 210/138 |
| 4,535,931 | A * | 8/1985 | Bartok et al. .......... 236/20 R |
| 4,606,823 | A * | 8/1986 | Lucas, III .................. 210/282 |
| 4,948,499 | A | 8/1990 | Peranio |
| 4,957,200 | A | 9/1990 | Turner et al. |
| 4,957,624 | A | 9/1990 | Peranio |
| 5,017,284 | A | 5/1991 | Miler et al. |
| 5,160,444 | A | 11/1992 | McFarland |
| 5,215,655 | A | 6/1993 | Mittermaier |
| 5,254,243 | A | 10/1993 | Carr et al. |
| 5,256,279 | A | 10/1993 | Voznick et al. |
| 5,443,739 | A | 8/1995 | Vogel et al. |
| 5,472,622 | A | 12/1995 | Solomon et al. |
| 5,587,055 | A | 12/1996 | Hartman et al. |
| 5,647,269 | A | 7/1997 | Miller et al. |
| 5,679,243 | A | 10/1997 | Cho |
| 5,755,957 | A | 5/1998 | Jeon |
| 5,776,333 | A | 7/1998 | Plester et al. |
| 5,795,996 | A * | 8/1998 | Chang et al. .......... 73/61.41 |
| 5,837,147 | A | 11/1998 | Joung |
| 5,858,248 | A | 1/1999 | Plester et al. |
| 5,918,625 | A * | 7/1999 | Ziehm .................. 137/357 |
| 6,009,585 | A * | 1/2000 | Middleton .............. 8/158 |
| 6,264,830 | B1 * | 7/2001 | Plester et al. .......... 210/85 |
| 6,416,673 | B1 | 7/2002 | Plester |

* cited by examiner

Primary Examiner—Peter A. Hruskoci
(74) Attorney, Agent, or Firm—Jeffrey S. Schubert; Schubert Osterrieder & Nickelson PLLC

(57) ABSTRACT

Hot water pipes, in areas with hard water, tend to fill with scale until they no longer pass enough water. De-scaling water pipes with acid is dangerous, expensive and damages the pipes. Ion exchange and reverse osmosis water softeners eliminate scale buildup in pipes, but are expensive. This invention is a means of keeping the scale precipitate, created when water is heated, inside the water heater by passing the hot water through a removal medium where the scale sticks to the surface. The removal medium can be placed inside the water heater or in a separate tank connected to the water heater; both configurations remove the precipitate from hot water; both save hot water pipes from scale accumulation.

12 Claims, 7 Drawing Sheets

METHOD FOR REMOVING SCALE CAUSING CHEMICALS IN HOT WATER SYSTEMS

REFERENCES CITED

| | | |
|---|---|---|
| 4948499 | August, 1990 | Peranio |
| 4957200 | August, 1990 | Turner et al. |
| 4957624 | September, 1990 | Periano |
| 5017284 | May, 1991 | Miller et al. |
| 5160444 | November, 1992 | McFarland |
| 5215655 | June, 1993 | Mittermaier |
| 5254243 | October, 1993 | Carr et al. |
| 5256279 | October, 1993 | Voznick et al. |
| 5443739 | August, 1995 | Vogel et al. |
| 5472622 | December, 1995 | Solomon et al. |
| 5587055 | December, 1996 | Hartman et al |
| 5647269 | July, 1997 | Miller et al. |
| 5679243 | October, 1997 | Cho |
| 5755957 | May, 1998 | Jeon |
| 5776333 | July, 1998 | Plester et al. |
| 5837147 | November, 1998 | Joung |
| 5858248 | January, 1999 | Plester et al. |
| 6416673 | July, 2002 | Plester |

CROSS-REFERENCE TO RELATED APPLICATIONS

Not Applicable

STATEMENT REGARDING FEDERALLY SPONSORED RESEARCH

Not Applicable

REFERENCE TO SEQUENCE LISTING, A TABLE, OR A COMPUTER PROGRAM LISTING COMPACT DISK APPENDIX

Not applicable

FIELD OF THE INVENTION

The invention relates to a water treatment system to remove scale from domestic or commercial hot water.

BACKGROUND OF THE INVENTION

In some places the water supply has so much calcium and other dissolved minerals that when the water is heated, solid precipitates form and accumulate as scale inside the water heater and hot water pipes. Scale accumulation inside the water heater typically reduces the life of large tanks, such as used by office buildings and apartment buildings with central hot water systems, from 5–8 years to 2–5 years. Domestically, scale buildup is not a concern; household water heaters and pipes last 10–20 years before scale becomes a problem, even when the water supply is very hard. However, many households still purchase water softeners. In areas where the water supply is hard, apartment complexes with central hot water supplies need to de-scale the hot water pipes about once every 6 years, costing up to $30,000 depending on the amount of damage to the pipes. Typically, iron pipes can be de-scaled about three times before they must be replaced.

A secondary problem is scale buildup in the water heater. One water heater manufacturer offers a "turbo" model which uses small orifices on the input pipe to create turbulence inside the tank. The concept is to flush out scale buildup with the turbulence. Unfortunately, it is cheaper to keep the scale in the water heater; a commercial size domestic water heater costs about $3,000 (including labor) to replace, while de-scaling the pipes is much more expensive.

Current water treatment methods are too effective and too costly for applications where the objective is reducing scale buildup in the water heater and hot water pipes. Ion exchange water softening systems, such as supplied by Culligan, are both expensive and costly to maintain. These systems require regular maintenance and when used to treat large quantities of water the upkeep makes them economically unfeasible.

Another treatment technique is reverse osmosis. Reverse osmosis systems can treat large quantities of water, as in semiconductor factories, and purify water through a reverse osmotic membrane. In addition to filtering out the carbonates that cause scale, these systems also remove heavy metals and biological contaminants. Reverse osmosis systems are more expensive than ion exchange systems and are directed towards improving water quality rather than only removing the chemicals that become scale. Both ion exchange and reverse osmosis systems remove scale, but at a cost where it is cheaper for office buildings and apartment complexes to de-scale and replace hot water pipes than purchase and maintain a water softener.

U.S. Pat. No. 6,416,673 and others, by Plester, and assigned to The Coca Cola Company, describe a filtering system consisting of a heater, filter and cooler; implemented to treat water for a soft drink dispenser. Plester's preferred method of removing scale from hot water is a filter made of polyester fiber mesh. Plester's patent differs from this invention in that the application is specifically for filtering water for a soft drink dispenser; a low volume application requiring a high removal efficiency. By comparison, this invention is for domestic or commercial hot water supplies with 10 to 10,000 times more volume, is less efficient, and uses granules or loose mesh material rather than a filter to remove the precipitate. There is no interest in improving taste, removing gasses, or sterilization as is desired for the Coca Cola application.

Other patents discovered in a patent search cover hot water tanks, heaters, valves, filters, additives, hardness sensors, control circuits, ionic exchange softeners, reverse osmosis, and stills. None of these devices are the same as this invention.

BRIEF SUMMARY OF THE INVENTION

It is specifically because the precipitates adhere together to form a solid that they are a problem and cause scale. Thus, all that is necessary to remove the precipitates is giving them ample opportunity to adhere somewhere harmless before traveling down the hot water pipes. For low volume applications, a filter would work, but it will clog in a domestic or commercial hot water application. This invention provides adequate scale removal for domestic or commercial hot water applications by spreading the water flow over a large area, allowing it to pass slowly through many small passages where there is ample time for the precipitate particles to come into contact and adhere to a surface. As a result of the large number of passage ways, there is minimal flow restriction.

Additionally, as scale accumulates on the surfaces, there needs to be a means for the filtration area to accommodate the scale buildup without further restricting flow. A large surface containing area, such as a pile of gravel or man made media with loose mesh, such as a spun glass, has enough open space to accommodate a lot of scale accumulation before restricting flow. Also, the flowing water can push loose granules and increase their separation as gaps between granules fill with scale buildup.

This invention is to place granules, or other material, as a layer inside water heater tanks, or in a separate tank. Providing a place inside the water heater tank for the removal medium would be part of the manufacturing process. The separate tank configuration has the advantage of being less costly to replace or rejuvenate, but it has the disadvantage of requiring extra space, which may not be available in existing boiler rooms, as well as extra installation costs.

Though the drawings show water heaters in the shape of a tank, this invention works with water heaters that do not use a tank. However, most domestic hot water applications use tank water heaters because they store a reserve of heated water to meet the demand during morning and evening hours. As a result, this invention allows, by means of a circulation pump, the water in the tank to become purer because the tank water is circulated up to 1,000 times through the removal medium during off peak time.

BRIEF DESCRIPTION OF THE DRAWINGS

The items in the drawings are labeled as follows:
HWH is the water heater;
P is the pump that circulates the hot water;
T is the tank containing the removal medium for the scale to deposit onto; and
TA is the area inside the hot water heater containing the removal medium for the scale to deposit onto.

The solid black lines with arrows in the drawings signify water pipes.

Valves, pipe joints, emergency relief valves and other devices not specifically part of this invention, but commonly used in such plumbing applications are not shown.

Figure 1:
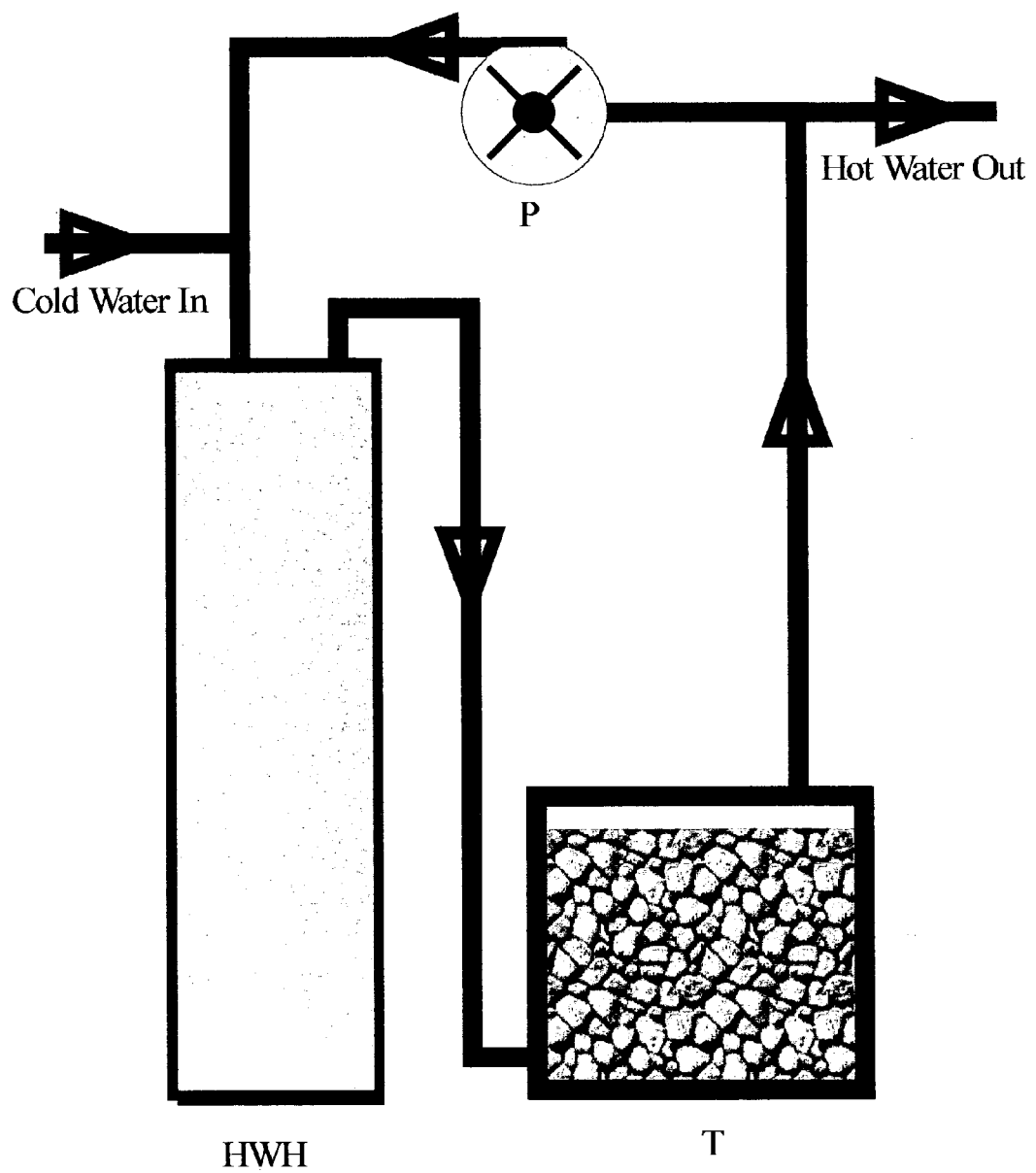

FIG. 1 shows the preferred embodiment; a standard home or commercial size hot water heater, followed by a separate tank which holds the removal medium for the scale to deposit onto, and a pump to circulate the water.

Figure 2:
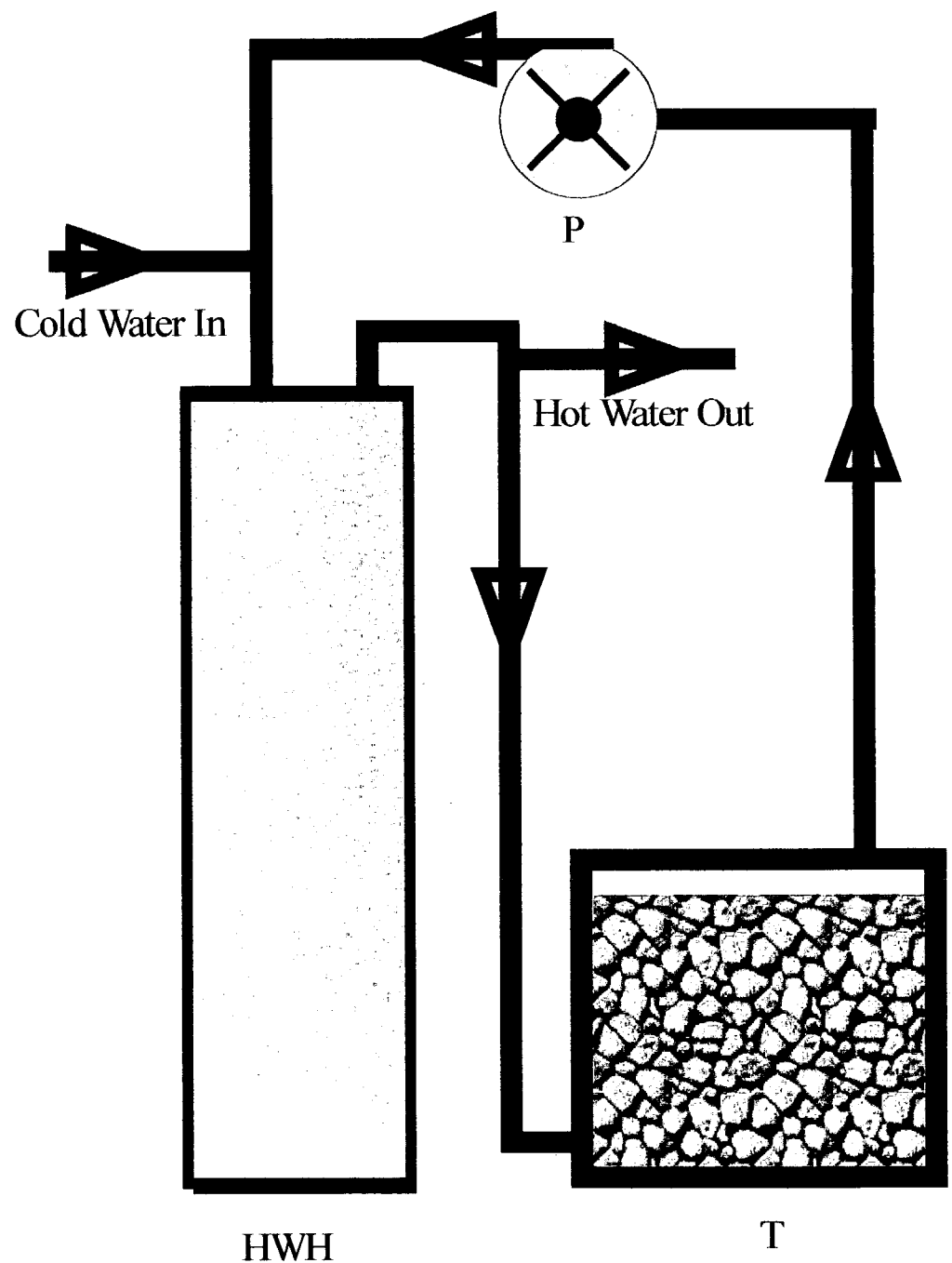

FIG. 2 is the same as FIG. 1 except the hot water departs at a different point.

Figure 3:
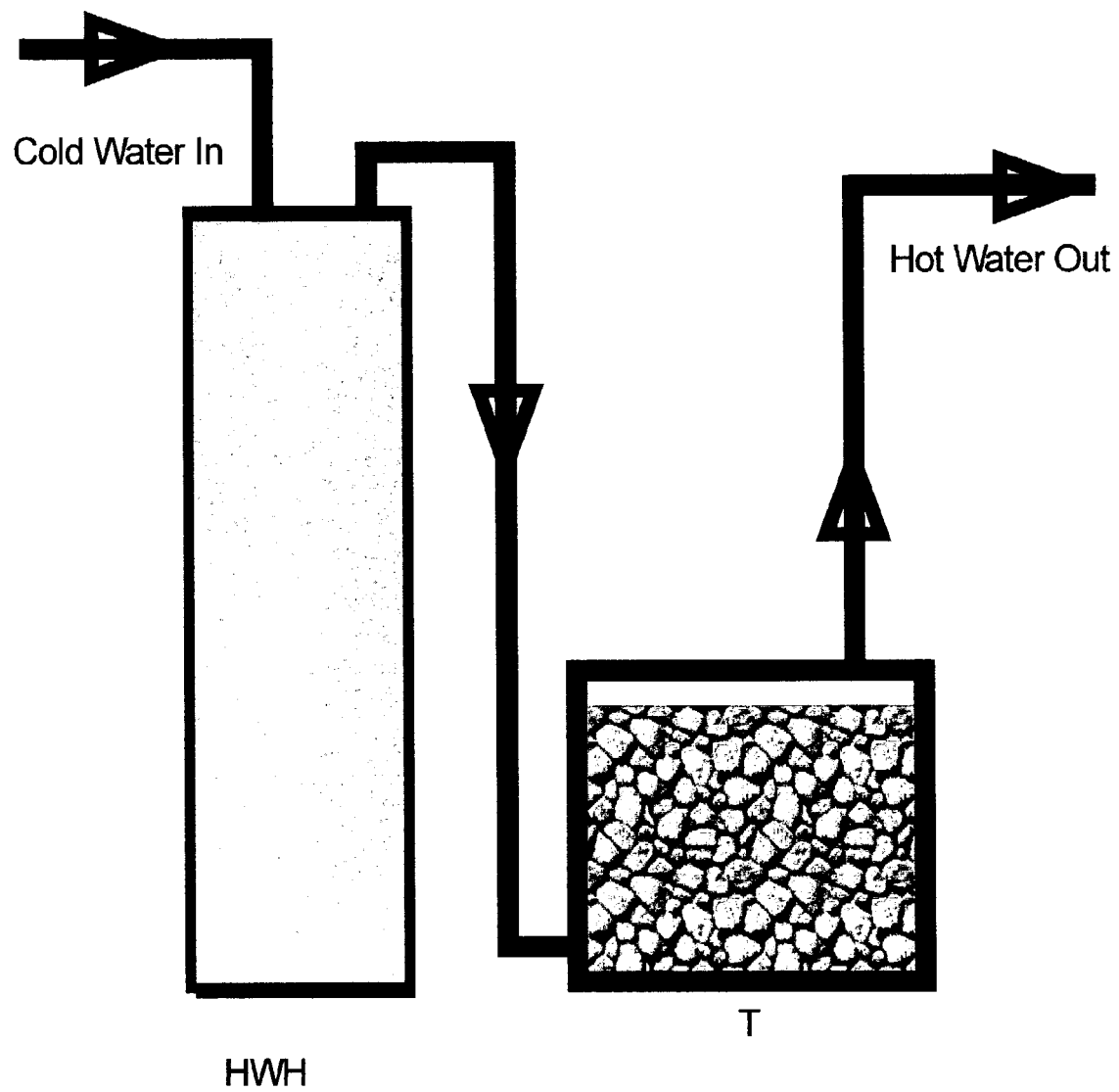

FIG. 3 depicts FIG. 1 without circulation.

Figure 4:
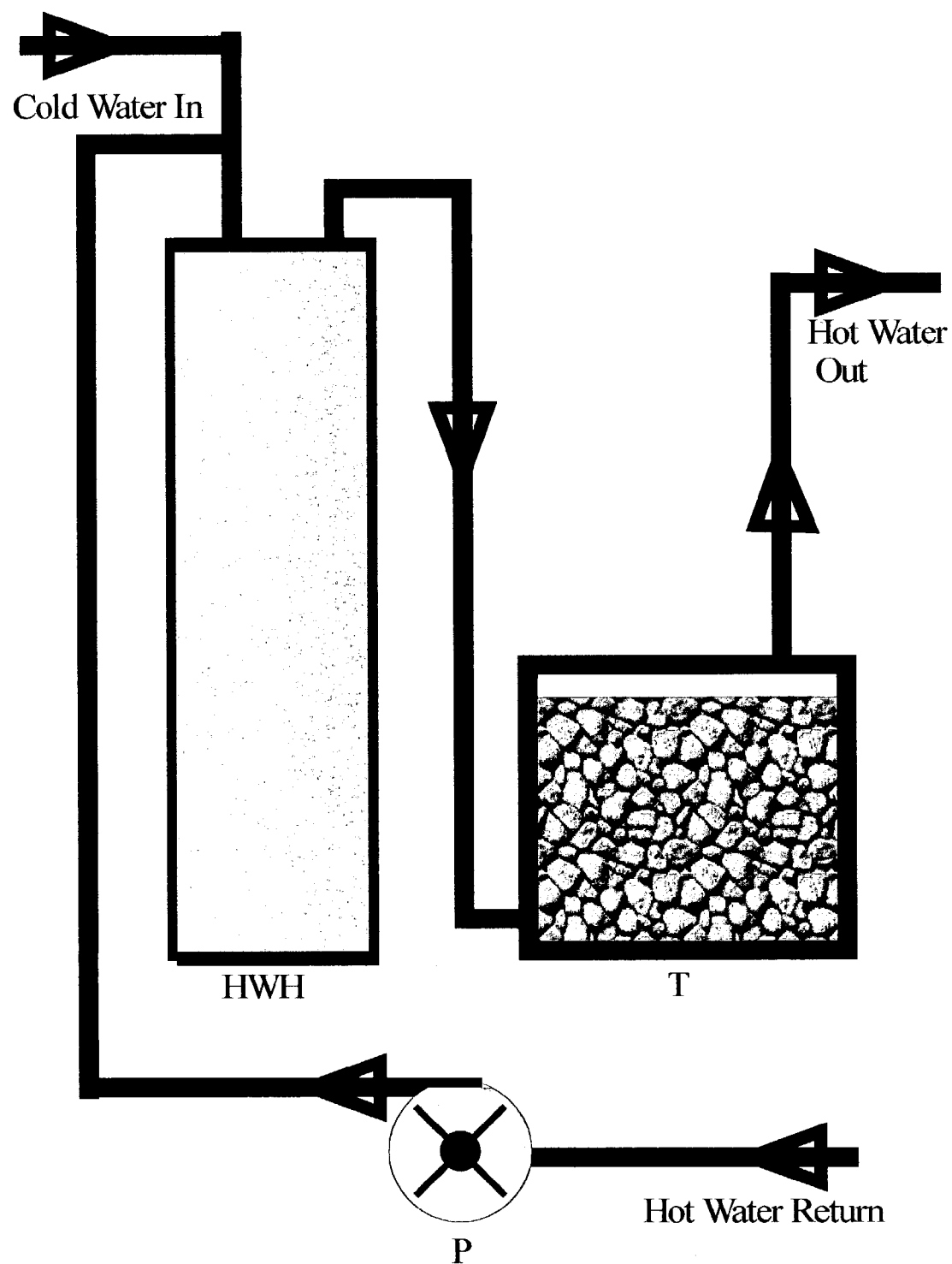

FIG. 4 is the same as FIG. 1 except the water circulates through the hot water return pipe, which is common to many central hot water systems.

Figure 5:
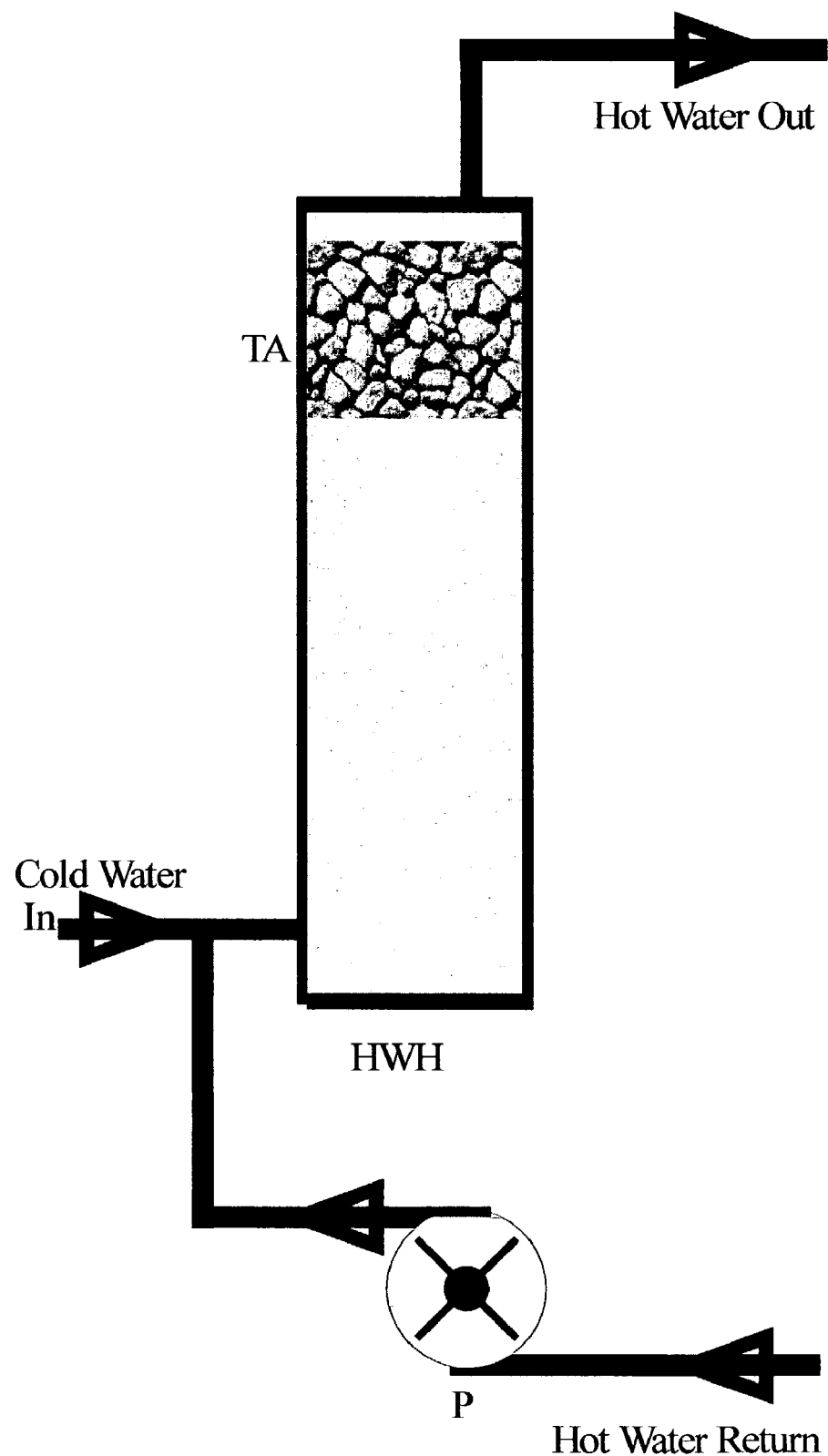

FIG. 5 is the same as FIG. 4 except the removal medium is inside the hot water tank.

Figure 6:
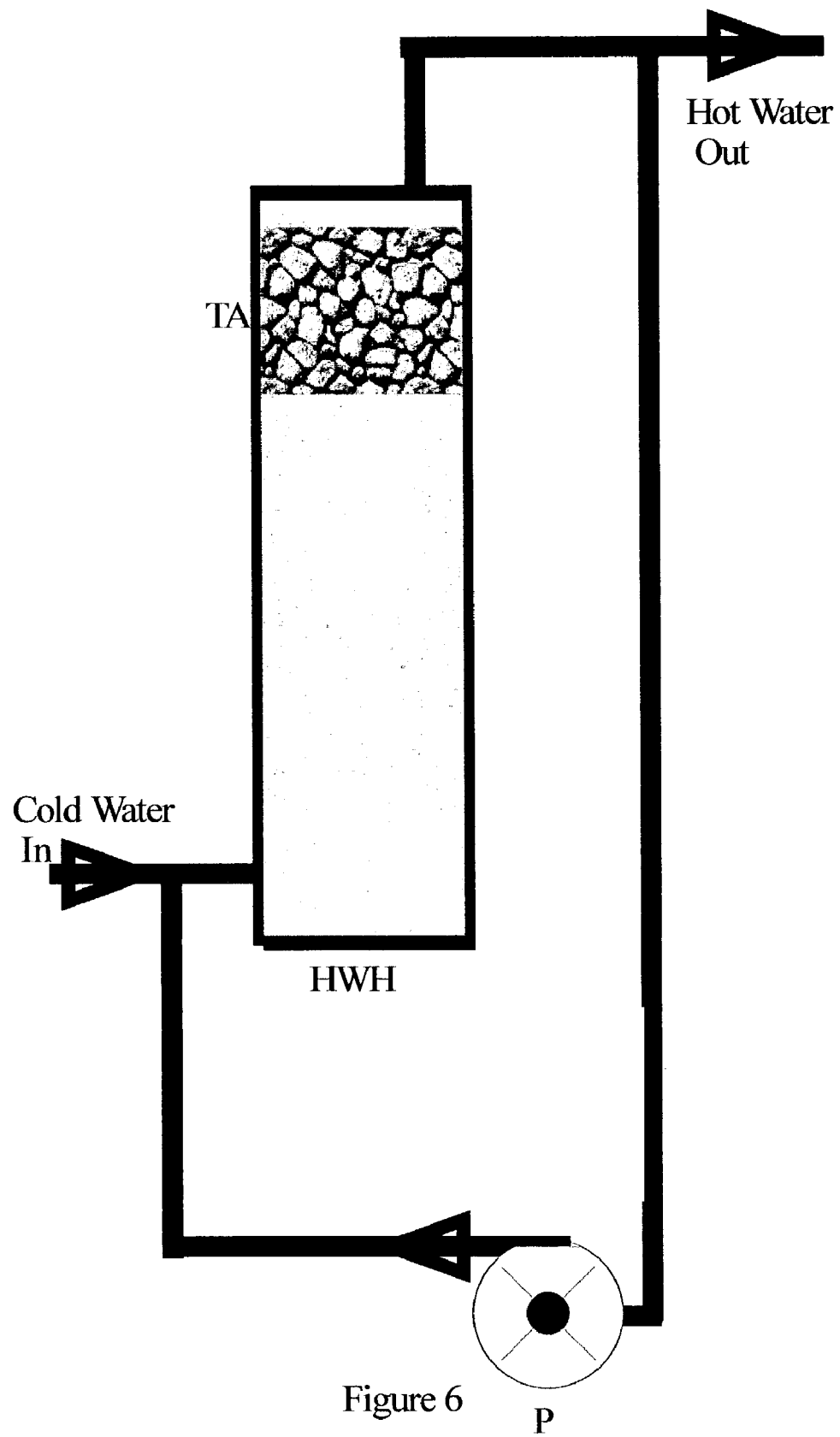

FIG. 6 is the same as FIG. 1 except the removal medium is inside the hot water tank.

Figure 7:
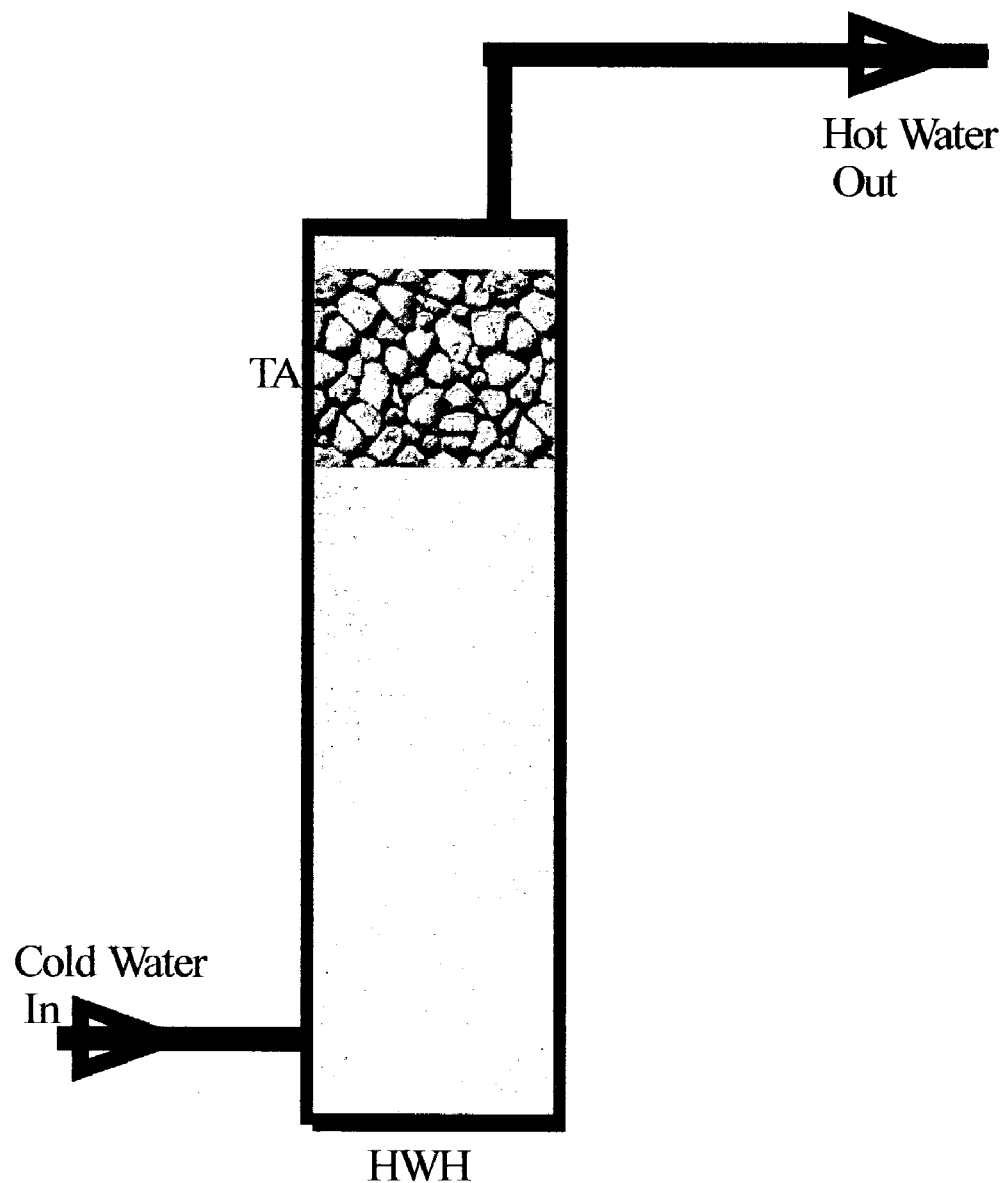

FIG. 7 shows the removal medium inside the hot water tank without circulation.

DETAILED DESCRIPTION OF THE INVENTION

For this invention, the removal medium is a bed of granules or loose mesh material, such as spun glass as long as the surface area of the bed of granules or loose mesh material is larger than that of the tank they are housed in. The granules can be metal, plastic, glass, or any other material. The height of the bed of granules or loose mesh material is also variable, the only restrictions being the amount of space in the tank where the removal medium is stored and how much scale the bed can accumulate before restricting flow. The bed can be held in place by screens, perforated plates or plates made of any material.

Secondly, whether inside a water heater or housed in a separate tank, the tank holding the removal medium needs an opening to load, remove, or replace granules or loose mesh material.

In addition, the tank holding the removal medium should have a window allowing inspection of the granules or loose mesh material without opening the tank. The surrounding pipes should also have a port to monitor scale buildup while the system is running.

Of the diagrams, FIG. 1 is the preferred embodiment. The cold water (Cold Water In) joins the circulated hot water and enters the water heater (HWH). The water is then heated and fed into the tank containing the removal medium (T). Within the tank, the water spreads over a bed of granules or loose mesh material, passing through the volume and depositing the precipitates on the removal medium. The treated water is then split at a junction where one pipe supplies the hot water pipes (Hot Water Out) and the other is fed back into the water heater (HWH) by means of a circulation pump (P).

FIG. 2 is a similar implementation, except the output to the hot water pipes (Hot Water Out) is taken from a junction at the output of the water heater (HWH). There is still a feedback loop as the other pipe enters the tank housing the removal medium (T) and all of the water exiting the tank is circulated by the pump (P) into the water heater (HWH).

In FIG. 3, the water heater (HWH) and the tank holding the removal medium (T) are cascaded. The cold water (Cold Water In) enters the water heater (HWH) and the output pipe of the water heater is connected to the tank containing the removal medium (T). The hot water pipes (Hot Water Out) are fed by output of the tank (T). There is no loop to circulate the water.

FIG. 4 is similar to FIG. 3 except there is a feedback loop. The hot water returning from the hot water pipes (Hot Water Return) is fed into the water heater (HWH) along with the cold water (Cold Water In). The heated water then goes through the tank holding the removal medium (T) to the hot water pipes (Hot Water Out).

FIG. 5 and FIG. 6 show configurations where the removal medium (TA) is stored inside the water heater (HWH). In FIG. 5, the hot water returning from the hot water pipes (Hot Water Return) enters the water heater (HWH) along with the cold water (Cold Water In). The water is then heated by the water heater (HWH) and flows through the removal medium inside the water heater (TA), removing the precipitate. The hot water pipes (Hot Water Out) are fed by the output of the water heater (HWH).

FIG. 6 is the same as FIG. 5 except a circulating pump (P) feeds the circulated water into the water heater (HWH) instead of the returning hot water. First, the cold water (Cold Water In) and circulated water enter the water heater (HWH). The water is then heated and flows through the removal medium (TA). The output of the water heater goes to a junction where one pipe feeds the hot water pipes (Hot Water Out) and the other is fed to the water heater (HWH) by means of a circulating pump (P).

FIG. 7 is similar to FIG. 6 except that there is no circulation. The cold water (Cold Water In) enters the water heater (HWH), goes through the removal medium (TA) and feeds the hot water pipes (Hot Water Pipes).

In addition to the above mentioned figures, one can use multiple tanks, water heaters, pumps and insulated pipes and valves to augment the above systems. Secondly, one can use valves before and after pumps, pipes and tanks to switch between in-use and offline units.

The water heater should heat the incoming cold water to between 50 and 110 degrees C. The solubility of calcium carbonate is inversely proportional to temperature; at higher temperatures more of it is in precipitate form and more of it will adhere to the granules or loose mesh material.

The water heater need not be housed in a tank. Only in configurations similar to FIG. 5 and FIG. 6 does the water heater need to have a space for the removal medium. When a separate unit houses the removal medium, any water heater will suffice.

Finally, a conductivity meter, or other hardness meter should monitor water hardness and the effectiveness of the removal medium in removing the precipitates that cause scale. This can be accomplished by connecting a meter, or meters, after or before and after the system, indicating the amount of precipitate removal.

Embodiments May Include:

A method for removing scale from hot water by passing the hot water through a removal medium, where removal medium is defined as a bed of metal, glass, plastic or other material granules or loose mesh material with far more surface area than the walls of the tank holding the granules or loose mesh material. As hot water passes through the removal medium the precipitate comes into contact with a solid surface and adheres to it, thus removing scale from the water.

The method for treating water further covering a location for the removal medium by placing it as a layer in the water heater tank.

The method for treating water further covering a location for the removal medium by placing it in a tank receiving the hot water leaving the water heater.

The method for treating water further covering a location for the removal medium by placing it in a tank which receives the hot water leaving the water heater, where there is extra room for the expansion of the removal medium as scale accumulates on the surfaces.

The method for treating water further covering a location for the removal medium by placing it as a layer in the water heater tank, where there is extra room for the expansion of the removal medium as scale accumulates on the surfaces.

The method for treating water with the use of a circulating pump to circulate the hot water through the removal medium.

The method for treating water further covering the use of an opening in the tank containing the removal medium, whether the water heater or a separate unit, large enough to load, remove or replace granules or loose mesh material.

The method for treating water where screens made of perforated plates or plates made of metal, plastic or mineral are placed inside the tank containing the removal medium, whether the water heater or a separate unit, hold the removal medium in place.

The method for treating water further covering the use of a viewing port to inspect the condition of the removal medium without opening the tank containing the removal medium, whether the water heater or a separate unit.

The method for treating water further covering the use of a viewing port or section of transparent pipe to inspect for scale accumulation without opening the pipes.

The method for treating water further covering the use of a conductivity meter, or other hardness meter, connected after or before and after the system indicating the amount of removal of scale causing minerals.

The method for treating water wherein the tanks and pipes are insulated.

The method for treating water where the tank containing the removal medium located has an opening to allow the replacement or removal of granules or loose mesh material after scale accumulation has restricted water flow, exceeded the designated volume capacity allowed by the tank, or both.

The method for treating water further covering the use of valves that allow switching between in-use and offline units, including valves before and after some or all pumps, pipes and tanks as appropriate for maintenance and replacement. The off-line units are either backups or units to be replaced or serviced.

The method for treating water using the various configurations shown in FIG. 1 through FIG. 7.

The method for treating water further covering all combinations of FIG. 1 through FIG. 7, such as the use of multiple circulation pumps, multiple tanks and other alterations and augmentations that use ideas from other figures.

The method for treating water further covering obvious variations to the configurations depicted in FIG. 1 through FIG. 7, or combination of configurations, such as connecting additional tanks in parallel or series.

The method for treating water further covering variations to the tank containing the removal medium, such shape or material composition, as well as the use of insulation on tanks and/or pipes.

I claim:

1. A method to reduce scale in hot water, the method comprising:

directing a flow of the hot water into a housing, the hot water having a temperature that reduces the solubility of a precipitate associated with the scale;

passing the flow between loose media of removal medium in the housing to adhere an amount of the precipitate upon contact to the loose media of the removal medium, wherein the removal medium has a surface area larger than a surface area of the housing and the loose of the removal medium are capable of movement in response to the flow when adherence of the precipitate to the loose media of the removal medium restricts the flow; and switching, via a valve, the flow between the housing and another housing containing said removal medium to designate an in-use housing and an offline housing, wherein the in-use housing receives the flow and the flow is blocked from reaching the offline housing.

2. The method of claim 1, further comprising pumping the hot water to circulate the hot water through the loose media of the removal medium.

3. The method of claim 1, further comprising monitoring hardness of the flow to determine the amount of precipitate removed from the hot water.

4. The method of claim 1, further comprising insulating housings and pipes associated with the flow of the hot water.

5. The method of claim 1, wherein passing the flow comprises passing the flow through the housing and another in-use housing in parallel or series.

6. A method for creating a supply of hot water for a building, which reduces scale in the hot water available to adhere to hot water pipes, the method comprising:

heating a quantity of water in a hot water heater to a temperature that reduces the solubility of a precipitate associated with the scale, the quantity of the hot water being sized to supply the hot water to the building via the hot water pipes; and directing a flow of the hot water from the hot water heater to a housing, the housing being adapted to pass the flow through a removal medium in the housing to adhere an amount of the precipitate upon contact to the removal medium, wherein the removal medium loose media and a surface area larger than a surface area of the housing and the removal medium comprises a number of passages to allow the hot water sufficient time to pass through the removal medium to adhere the amount of the precipitate.

7. The method of claim 6, further comprising supplying the hot water for the building from an outlet of the housing.

8. The method of claim 6, further comprising re-circulating the hot water through the removal medium one or more times during an off-peak time.

9. The method of claim 6, further comprising pumping the hot water to circulate the hot water through the removal medium.

10. The method of claim 6, further comprising monitoring hardness of the flow to determine the amount of precipitate removed from the hot water.

11. The method of claim 6, further comprising insulating the housing and the hot water pipes.

12. The method of claim 6, wherein directing the flow comprises passing the flow through the housing and another housing in parallel or series.

* * * * *

UNITED STATES PATENT AND TRADEMARK OFFICE
CERTIFICATE OF CORRECTION

| | | |
|---|---|---|
| PATENT NO. | : 7,001,524 B2 | Page 1 of 1 |
| APPLICATION NO. | : 10/449509 | |
| DATED | : February 21, 2006 | |
| INVENTOR(S) | : Steven Clay Moore | |

It is certified that error appears in the above-identified patent and that said Letters Patent is hereby corrected as shown below:

Claim 6, at Column 7, line 10 should be corrected as follows:

after ", wherein the removal medium" and before "loose media and", add --has--

Signed and Sealed this

Nineteenth Day of September, 2006

JON W. DUDAS
*Director of the United States Patent and Trademark Office*